July 12, 1932.　　　　H. M. PINGEN　　　　1,866,904
METHOD OF ASSEMBLING THE STEMS AND ASSOCIATED PARTS
OF INCANDESCENT ELECTRIC LAMPS
Filed July 19, 1930
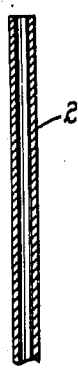
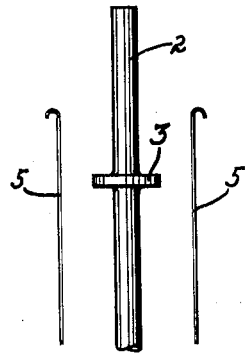
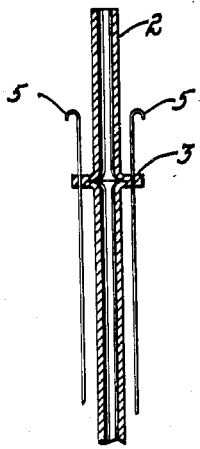
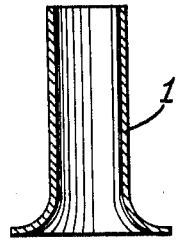
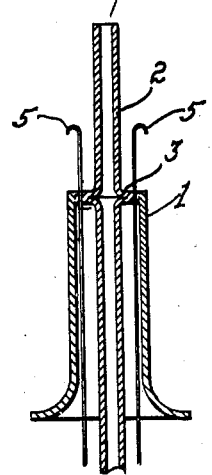
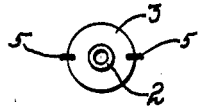
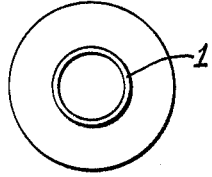
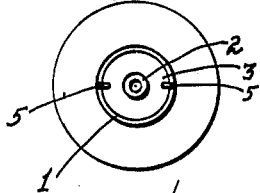
Inventor
Henry M. Pingen,
By Owen D Owen,
Attorneys.

Patented July 12, 1932

1,866,904

UNITED STATES PATENT OFFICE

HENRY M. PINGEN, OF TOLEDO, OHIO

METHOD OF ASSEMBLING THE STEMS AND ASSOCIATED PARTS OF INCANDESCENT ELECTRIC LAMPS

Application filed July 19, 1930. Serial No. 469,234.

This invention relates to incandescent electric lamps and particularly to the stem portions thereof and the method of securing the exhaust tubes and lead-in wires therein.

In the methods heretofore employed of securing exhaust tubes in the stems of incandescent electric lamps and sealing the lead-in wires therein, particularly where the exhaust tube is intended to be left open throughout its length for exhausting purposes, the joining and sealing has usually been effected by fusing the glass of the stem and tube at the point of joining and then flattening portions thereof at opposite sides of the tube and against the lead-in wires. This method is objectionable mainly due to the difficulty experienced in flattening the side portions of the stem and tube at the point of joining without closing the tube.

The object of my invention is the provision of a method for effecting a joining of the stems, exhaust tubes and lead-in wires of incandescent electric lamps without collapsing or closing the tube and in a simple, efficient and inexpensive manner.

The invention is fully described in the following specification and a method of practicing the same illustrated in the accompanying drawing, in which—

Figure 1 illustrates in longitudinal section an exhaust tube in its initial form; Fig. 2 is a similar view with the tube partially shortened by axial pressure to effect enlarging or bulging of a portion thereof; Fig. 3 is a side elevation of the tube with the bulged portion flattened to form an annular rib or projection and with two lead-in wires in adjacent assembling relation thereto; Fig. 4 is a sectional view of the tube shown in Fig. 3 with the lead-in wires anchored in the annular shoulder; Fig. 5 is a central longitudinal section of the stem portion with which the exhaust tube and lead-in wires are to be assembled; Fig. 6 is a central longitudinal section of the stem and tube members in assembled relation and with the lead-in wires secured therein, and Figs. 7, 8 and 9 are top views, respectively, of Figs. 4, 5 and 6.

Referring to the drawing, 1 designates the usual stem member of an incandescent electric lamp which is made of glass, is cylindrical in cross section, and has both ends open with its outer end, that is, the end which is outermost with respect to a lamp bulb when secured therein, flared outwardly to facilitate its joining with the glass at the adjacent end of a bulb, as well understood in the art. The inner end of the stem 1 is preferably open to the full extent of the passageway through the stem although such opening may be restricted if desired by providing the stem end with an inturned annular flange.

The exhaust tube member embodying the invention is designated 2 and is provided intermediate its ends with an annular flange or enlargement 3, which may be formed in the tube in any suitable manner, as for instance, by heating a portion of the tube and then applying endwise collapsing pressure to the tube to effect an outward expansion of the tube wall, as partially indicated in Fig. 2. In order to insure the outward expansion of the heated portion of the tube during the shortening process, it is preferable to apply air pressure to the interior of the tube. After the bulge 4 has been formed on the tube, as shown in Fig. 2, it is preferably broadened and flattened, as shown in Figs. 3, 4 and 6, by clamping action or die pressure. It is apparent that while I have suggested a method of forming the flange 3 on the exhaust tube, I do not intend to be restricted to such method, as this may be accomplished in any suitable or well known manner.

The lead-in wires, which are designated 5, may be anchored to the flange 3 while the flange is soft and during the shaping thereof, or the flange may be subsequently heated to permit a sufficient forcing of the wires therein to maintain the tube and wires in united relation while being assembled in the stem 1.

When the lead-in wires and tube have been united, as shown for instance in Fig. 4, they are inserted through the stem 1, the flange 3 being preferably of a diameter substantially equal to that of the interior of the stem, the flange being disposed at the inner end of the stem. Heat is then applied to the stem and flange at the point of joining so as to effect a fusing together of the two and a secure sealing-in of the lead-in wires, as indicated in Fig. 6. It will be understood that the stem and tube are usually of glass so that a fusing together of the two may be easily effected.

It will be apparent that this provides a simple and efficient method of assembling the stem, exhaust tube, and lead-in wires of incandescent electric lamps and at the same time maintaining the exhaust tube open throughout its length, and also that while I have shown a particular form of the parts, this is merely for purposes of illustration and is not intended to restrict the invention beyond the scope of the claims.

Having thus described my invention, what I claim as new and desire to secure by U. S. Letters Patent is:

1. The method of assembling the stem, exhaust tube and lead-in wires of an incandescent electric lamp, which consists in providing a stem with an opening longitudinally therethrough, providing an exhaust tube of less diameter than the stem opening and having an enlargement intermediate its ends which substantially fits in the inner end portion of the stem, anchoring lead-in wires in said enlargement and extending them through the stem and then fusing the tube enlargement and inner end portion of the stem together to effect a sealing of the inner end of the stem and to secure anchoring and sealing of the lead-in wires.

2. The method of assembling the stem, exhaust tube, and lead-in wires of an incandescent electric lamp which comprises providing a cylindrical stem, forming an exhaust tube with a shoulder intermediate its ends, said shoulder being of substantially the same diameter as the interior of the stem, then anchoring lead-in wires in said shoulder and finally fusing the shoulder to the upper extremity of the stem to effect a sealing of the upper end of the latter and a secure anchorage for said lead-in wires.

In testimony whereof I have hereunto signed my name to this specification.

HENRY M. PINGEN.